(12) United States Patent
Czaplewski et al.

(10) Patent No.: US 8,166,389 B2
(45) Date of Patent: Apr. 24, 2012

(54) METHODS AND APPARATUS FOR INCLUDING CUSTOMIZED CDA ATTRIBUTES FOR SEARCHING AND RETRIEVAL

(75) Inventors: Jeff P. Czaplewski, Chicago, IL (US); Catherine Joyce Lazatin, Palatine, IL (US); Wendy Lynne Bohner, Grayslake, IL (US); David Anthony Czarnecki, Clifton Park, NY (US); Alan Ru Lin Liu, Bartlett, IL (US)

(73) Assignee: General Electric Company, Schenectady, NY (US)

( * ) Notice: Subject to any disclaimer, the term of this patent is extended or adjusted under 35 U.S.C. 154(b) by 1006 days.

(21) Appl. No.: 11/673,078

(22) Filed: Feb. 9, 2007

(65) Prior Publication Data

US 2008/0195658 A1    Aug. 14, 2008

(51) Int. Cl.
*G06F 17/00* (2006.01)
(52) U.S. Cl. ........ 715/234; 715/233; 715/241; 715/255; 707/711; 707/741
(58) Field of Classification Search ................. 715/233, 715/234, 241, 255; 707/200, 711, 741
See application file for complete search history.

(56) References Cited

U.S. PATENT DOCUMENTS

| | | | |
|---|---|---|---|
| 5,761,685 A | 6/1998 | Hutson | |
| 6,304,869 B1 | 10/2001 | Moore et al. | |
| 6,732,090 B2 * | 5/2004 | Shanahan et al. | 1/1 |
| 7,051,012 B2 | 5/2006 | Cole et al. | |
| 7,143,091 B2 | 11/2006 | Charnock et al. | |
| 7,171,664 B2 * | 1/2007 | Wang et al. | 718/100 |
| 7,257,772 B1 * | 8/2007 | Jones et al. | 715/234 |
| 7,546,288 B2 * | 6/2009 | Springer et al. | 1/1 |
| 7,631,004 B2 * | 12/2009 | Skibo et al. | 1/1 |
| 7,647,349 B2 * | 1/2010 | Hubert et al. | 1/1 |
| 7,798,417 B2 * | 9/2010 | Snyder et al. | 235/494 |
| 7,853,621 B2 * | 12/2010 | Guo | 707/803 |
| 2001/0047365 A1 * | 11/2001 | Yonaitis | 707/200 |
| 2002/0103811 A1 * | 8/2002 | Fankhauser et al. | 707/104.1 |
| 2005/0027687 A1 * | 2/2005 | Nowitz et al. | 707/3 |
| 2006/0041606 A1 * | 2/2006 | Sawdon | 707/205 |

(Continued)

FOREIGN PATENT DOCUMENTS

| | | |
|---|---|---|
| EP | 1355241 A2 | 10/2003 |
| WO | 0182110 A1 | 11/2001 |

OTHER PUBLICATIONS

Liora Alschuler, HL7 Clinical Document Architecture, Release 2, Journal of the American Medical Informatics Association, vol. 13, No. 1, Feb. 2006.* European Patent Office Search Report for EP08101375, dated Jun. 17, 2008, 8 pages.

*Primary Examiner* — Stephen Hong
*Assistant Examiner* — Matthew Ludwig
(74) *Attorney, Agent, or Firm* — Hanley, Flight & Zimmerman, LLC

(57) ABSTRACT

A method for storing customized attributes in a clinical document architecture (CDA) document to provide searching functionality in a clinical environment includes retrieving, from a clinical database, attributes to be attached to a document in accordance with scripted instructions received from a user. The method further includes concatenating the retrieved attributes in accordance with the scripted instructions to create a customized, derived attribute, storing the customized, derived attribute in the document, and sending the document with the customized, derived attribute to the clinical database for storage.

20 Claims, 3 Drawing Sheets

U.S. PATENT DOCUMENTS

| | | | |
|---|---|---|---|
| 2006/0184516 A1* | 8/2006 | Ellis | 707/3 |
| 2007/0078900 A1* | 4/2007 | Donahue | 707/200 |
| 2007/0211293 A1* | 9/2007 | Komamura | 358/1.18 |
| 2008/0069132 A1* | 3/2008 | Ellard et al. | 370/427 |
| 2009/0049015 A1* | 2/2009 | Imanishi | 707/3 |
| 2010/0211571 A1* | 8/2010 | Prahlad et al. | 707/741 |

* cited by examiner

METHODS AND APPARATUS FOR INCLUDING CUSTOMIZED CDA ATTRIBUTES FOR SEARCHING AND RETRIEVAL

BACKGROUND OF THE INVENTION

This invention relates generally to methods and apparatus for database searching and retrieval, and more particularly for methods and apparatus for clinical database architecture database document searching and retrieval.

Documents in a clinical environment must be stored and retrieved from a defined storage area, such as a central clinical database. In at least one known clinical document architecture (CDA) storage and retrieval system, documents can be given attributes, the attributes can be given values by users, and the documents with their attributes and values can be stored in the database. Stored documents can later be searched for using their attributes and attribute values. However, the known CDA storage and retrieval system is limited to a fixed set of attributes and static attribute values (e.g., fixed text and numbers). This limitation can decrease the efficiency and overall productivity of users because several searches may be required to retrieve the document or documents the users are seeking.

BRIEF DESCRIPTION OF THE INVENTION

Therefore, in one aspect, some configurations of the present invention provide a method for storing customized attributes in a clinical document architecture (CDA) document to provide searching functionality in a clinical environment. The method includes retrieving, from a clinical database, attributes to be attached to a document in accordance with scripted instructions received from a user. The method further includes concatenating the retrieved attributes in accordance with the scripted instructions to create a customized, derived attribute, storing the customized, derived attribute in the document, and sending the document with the customized, derived attribute to the clinical database for storage.

In another aspect, some configurations of the present invention provide an apparatus for storing customized attributes in a clinical document architecture (CDA) document to provide searching functionality in a clinical environment. The apparatus includes a computer, a script interpreter software module, a user display, a user input device, a document editor software module, and a database connection software module. The apparatus is configured to retrieve, from a clinical database, attributes to be attached to a document in accordance with scripted instructions received from a user. The apparatus is further configured to concatenate the retrieved attributes in accordance with the scripted instructions to create a customized, derived attribute, include the customized, derived attribute in the document, and send the document with the customized, derived attribute in the clinical database for storage.

In yet another aspect, some configurations of the present invention provide a medium or media having recorded thereon machine readable instructions configured to instruct a processor to store customized attributes in a clinical document architecture (CDA). The machine readable instructions include instructions configured to instruct the processor to retrieve, from a clinical database, attributes to be attached to a document in accordance with scripted instructions received from a user. The machine readable instructions further includes instructions configured to instruct the processor to concatenate the retrieved attributes in accordance with the scripted instructions to create a customized, derived attribute, include the customized, derived attribute in the document, and write the document with the customized, derived attribute in the clinical database.

It will be appreciated that some configurations of the present invention allow users to add customized attributes to a CDA document while creating, editing, and/or storing the document. Thus, users can retrieve these documents quickly and easily by searching for the customized attributes. These attributes can be created, their relationship to the document persisted, and later be searched upon, thereby reducing the time necessary for search and retrieval of documents in clinical databases.

DETAILED DESCRIPTION OF THE INVENTION

Figure 1:
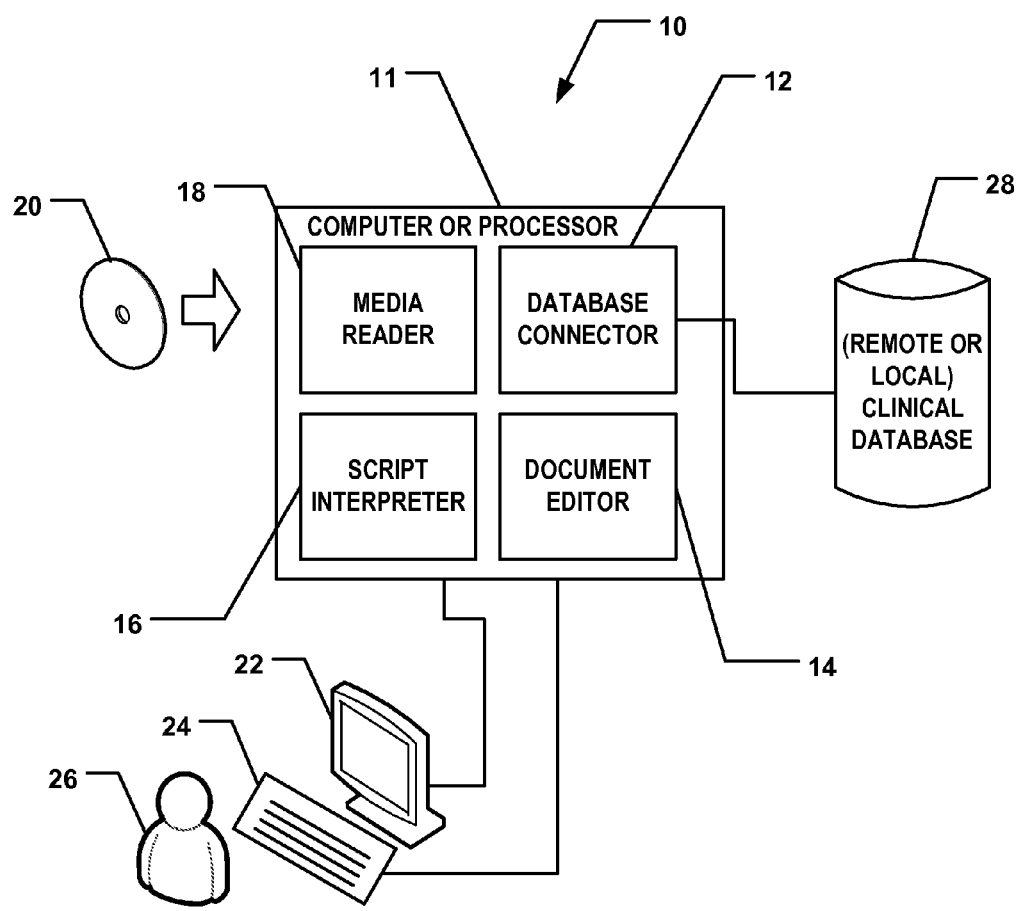
FIG. 1 is a schematic block diagram of a clinical database architecture system including a configuration of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements having or not having that property.

Configurations of the present invention allow users to add customized attributes to a CDA document while creating, editing, and/or storing the document. Thus, users can retrieve these documents quickly and easily by searching for the customized attributes. These attributes can be created, their relationship to the document persisted, and later be searched upon. Thus, a technical effect of the present invention is to speed up search and retrieval of documents in databases. Another technical effect is the inclusion of attributes that allow variations of hospital procedures (such as how waiting time is counted) to be transparent to the search and retrieval of documents based upon stored procedure attributes.

For example, a user may want to classify a specific report as "Type A." If so, the user can add "Type A" to the document as a customized attribute. When searching the system later, the user can specify "Type A" as a search criterion and quickly retrieve the document or a set of documents with this attribute. When a document is released, a customized attribute can be added to the report defining the "time to release the document". This attribute can then be searched on later to gather a list of reports that took 'x' amount of time to release. These uses of the invention are provided as examples only, without limiting the invention.

In various configurations, custom attributes can be user-defined values. These values can be derived from existing values in the system or can be created on the fly using a user-interface to a human-readable scripting language. The custom attributes can be added to the actual document itself or can be stored in a database depending on how the searching will take place. However, the storage techniques described herein are provided by way of example only and not by way of limitation.

Some configurations of the present invention allow a user or users to create customized attributes for storing in a CDA document, and allow the user or users to search for documents using the customized attributes as search criteria, thus reducing the amount of time spent searching for documents. For example, in some configurations, users can categorize documents for any reason or purpose by adding attributes to the document. If the business is then interested in viewing a list of documents with a specific attribute (such as, "documents that took 3 days to release"), the list is easily retrieved.

In some configurations of the present invention and referring to FIG. 1, an apparatus 10 for storing customized attributes in a clinical document architecture (CDA) document to provide searching functionality in a clinical environment is provided. Apparatus 10 includes a computer or processor 11 (hereinafter referred to simply as "computer 11") a script interpreter software module 16, a user display 22 for a user 26, a user input device 24 such as a keyboard and/or a mouse, a document editor software module 14, and a database connection software module 12. Apparatus 10 may also include a media reader 18 for reading machine readable instructions recorded on one or more medium or media 20 such as, for example, a floppy diskette, a CD-ROM, a DVD, flash ROM, a hard disk, a DVD-RW, DVD+RW, CD-R, CD-RW. In configurations in which machine readable instructions are recorded on media (i.e., more than one), the media need not all be of the same type. Database connector software module 12, document editor software module 14, and script interpreter software module 16 may, for example, comprise instructions recorded on medium 20 and read into a primary memory of computer 11 by media reader 18 in some configurations, and/or may partially or fully consist of firmware recorded in a ROM. Database connector software module 12 (hereinafter, "database connector 12") may be, in many configurations, a database client program or module. Similarly, clinical database 28 may be, in many configurations, a remote database server. However, technical details by which database connector 12 and clinical database 28 interact (or indeed, whether they are on different computers or even whether they are different processes on the same computer) are not critical to the present invention.

In some configurations of the present invention, database connector software module 12 is configured to access a remote (i.e., not stored in computer 11) and/or local (i.e., stored in computer 11) clinical database containing documents stored in accordance with a clinical database architecture (CDA) specification. Documents can be read or created by document editor 14 and attributes read, created, added to, deleted, and/or modified by script interpreter 16.

Figure 2:
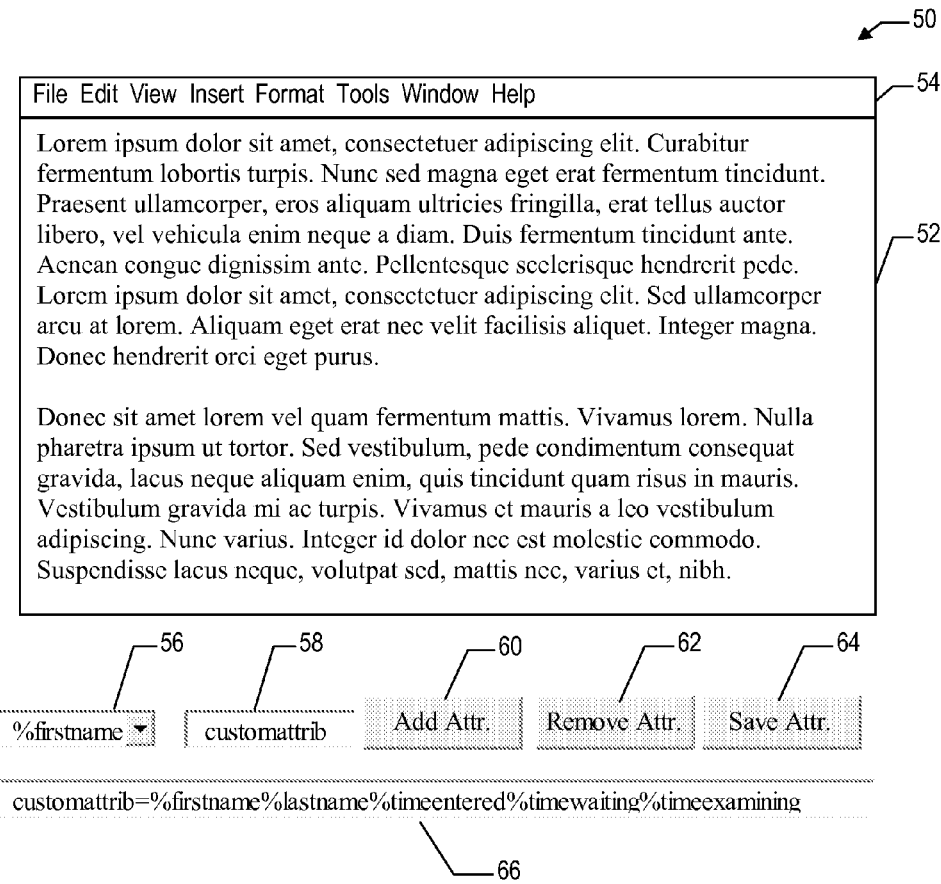
FIG. 2 is a drawing of an editing screen such as might be produced by the computer of FIG. 1.

An example of a suitable document editor screen 50 displayed on display 22 and editable by a user 26 using input device 24 is shown in FIG. 2. An example document editor screen 50 can include a text editing window 52, a menu bar 54 for editing text in window 52, as well as various controls to embed scripted instructions 66 in a text file containing the text in the text window. Custom attributes 66 may be embedded, for example, as metadata. For example, a custom attribute 58 name (in the example, "customattrib") can be typed at an appropriate box in screen 50 to name the custom attribute. Available substitution commands 56 are provided in a drop-down selection control to more easily enable user 26 to build scripted instruction 66. Custom attribute 58 (and/or substitution commands 56) may be entered, removed, or saved using buttons 60, 62, or 64, respectively, which may be activated, for example, by moving a mouse cursor over the button and pressing a button on the mouse. Saving the file with custom attribute(s) 66 can be accomplished, for example, by selecting a "save" or "save as" function under the "File" submenu.

Figure 3:
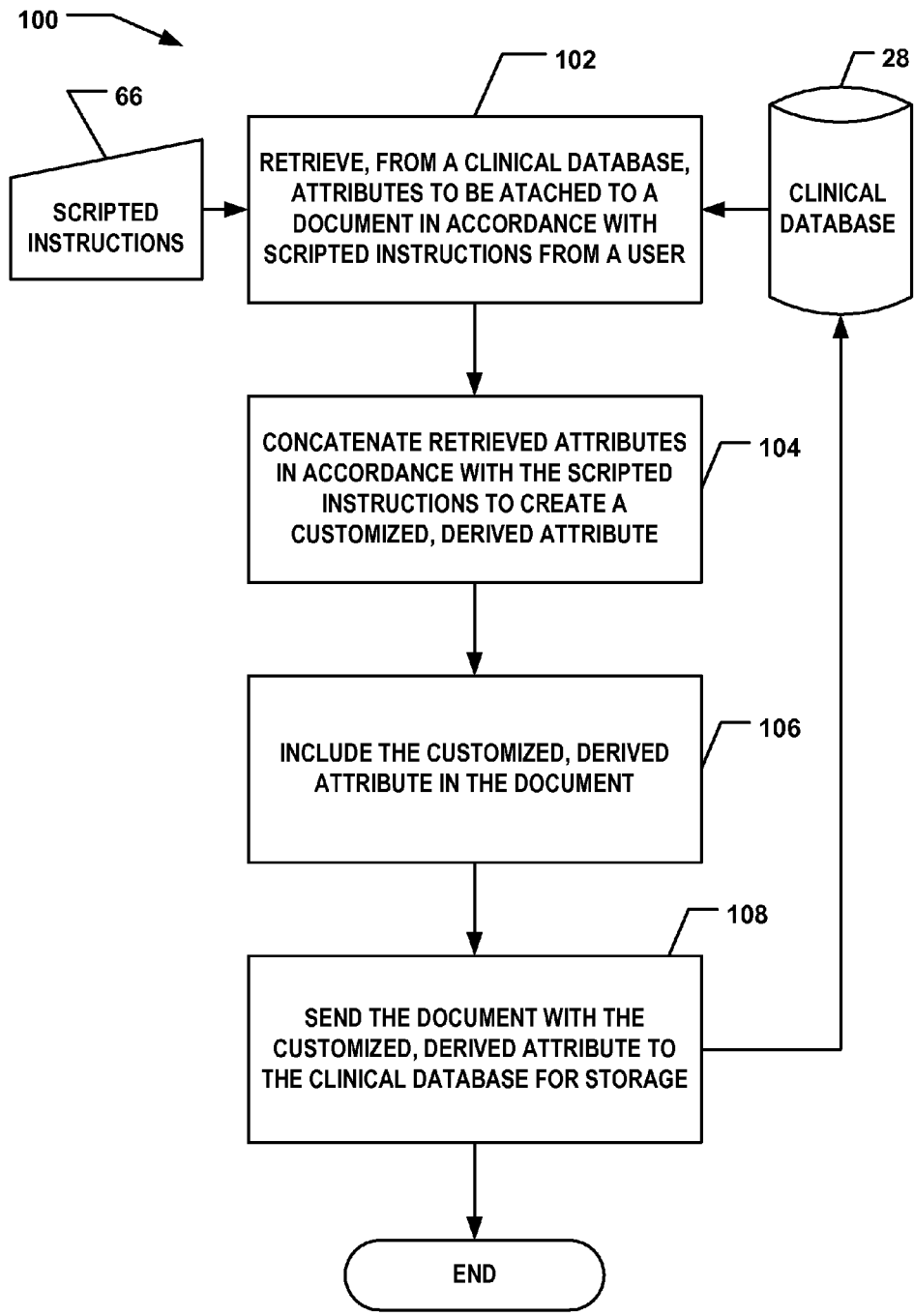
FIG. 3 is a flow chart illustrative of a method performed by some configurations of the present invention and/or embodied in machine readable instructions on a medium or media in some configurations of the present invention.

In some configurations of the present invention and referring now to flowchart 100 of FIG. 3 in conjunction with FIG. 1, at 102, database connector 12 is configured to retrieve, from clinical database 28, attributes to be attached to a document in accordance with scripted instructions 66 received from a user 26. These scripted instructions are provided via input device 24. At 104, document editor 24 (or another software component running in computer 11) concatenates the retrieved attributes in accordance with scripted instructions 66 to create a customized, derived attribute 66. At 106, document editor 14 then includes customized, derived attribute 66 in the document. Customized, derived attribute 66 may be included in the document in the form of metadata that is not displayed in text editing (or viewing) window 52. Then, when the document is saved at 108, it is sent with the customized, derived attribute 66 to clinical database 28 for storage.

In some configurations of the present invention and as suggested in FIG. 2, apparatus 10 is further configured to receive scripted instructions 56 to select a patient's name or portions thereof, or other identification (such as a patient number), from clinical database 28. Also, in some configurations of the present invention, script interpreter software module 16 is further configured to interpret scripted instructions 66 including one or more members of the group consisting of the time the patient first entered a caregiving facility, and starting times, ending times, and durations of one or more members of the group consisting of:

time in a waiting room,
time in an examination room, and
time examining the patient.

Also, in some configurations of the present invention, apparatus 10 is further configured to search for a customized, derived attribute in a document utilizing a computed waiting time obtained using two or more members of the set consisting of the time the patient first entered a caregiving facility, and starting times, ending times, and durations of one or more members of the set consisting of:

time in a waiting room,
time in an examination room, and
time examining the patient.

More generally, in some configurations of the present invention, apparatus 10 is further configured to search for a document utilizing customized, derived attribute 66. Script interpreter 16 may also include an editing module configured to edit customized, derived attribute 66 to include an additional attribute. See, for example, "Add Attr." button 60 in FIG. 2. In some configurations, the additional attribute is a time for release of the document.

The novelty of the idea comes the user-defined attributes themselves and the storing of the relationship between the attribute and document for searching purposes. It is more than likely that the unique attributes can be added to a document, and that documents can be searched on. What is not unique about this instance is that the attributes being added are user-defined attributes created via a scripting language using values from the database or other available information. The use of these attributes to then provide additional per business-need functionality (search-ability) completes the novelty of the invention.

While the invention has been described in terms of various specific embodiments, those skilled in the art will recognize that the invention can be practiced with modification within the spirit and scope of the claims.

What is claimed is:

1. A method for storing customized attributes in a clinical document architecture (CDA) document to provide searching functionality in a clinical environment, said method comprising:
   receiving scripted instructions from a user defining attributes for categorizing documents in a CDA and for combining the attributes to form a customized, derived attribute;
   retrieving, from a clinical database, attributes to be attached to a document in accordance with the received scripted instructions;
   concatenating the retrieved attributes in accordance with the scripted instructions to create the customized, derived attribute;
   embedding the customized, derived attribute as metadata within the document and including a relationship between the customized, derived attribute and the document;
   categorizing the document with other documents that include the same customized, derived attributes; and
   sending the document with the metadata to the clinical database for storage.

2. A method in accordance with claim 1 further comprising providing scripted instructions to select a patient's name or portions thereof, or other identification for inclusion in the customized, derived attribute.

3. A method in accordance with claim 2 further comprising providing scripted instructions to select and include in the customized, derived attribute one or more members of the group consisting of the time the patient first entered a caregiving facility, and starting times, ending times, and durations of one or more members of the group consisting of:
   time in a waiting room,
   time in an examination room, and
   time examining the patient.

4. A method in accordance with claim 3 further comprising searching for documents containing customized, derived attributes obtained using two or more members of the group utilizing a computed waiting time consisting of the time the patient first entered a caregiving facility, and starting times, ending times, and durations of one or more members of the group consisting of:
   time in a waiting room,
   time in an examination room, and
   time examining the patient.

5. A method in accordance with claim 1 further comprising searching for a document utilizing the customized, derived attribute.

6. A method in accordance with claim 1 further comprising editing the customized, derived attribute to include an additional attribute.

7. A method in accordance with claim 6 wherein the additional attribute is a time for release of the document.

8. An apparatus for storing customized attributes in a clinical document architecture (CDA) document to provide searching functionality in a clinical environment, said apparatus comprising a computer, a script interpreter software module, a user display, a user input device, a document editor software module, and a database connection software module, said apparatus configured to:
   receive scripted instructions from a user;
   retrieve, from a clinical database, attributes to be attached to a document in accordance with the received scripted instructions;
   concatenate the retrieved attributes in accordance with the scripted instructions to create a customized, derived attribute;
   embed the customized, derived attribute as metadata within the document and include a relationship between the customized, derived attribute and the document;
   categorize the document with other documents that include the same customized, derived attributes; and
   send the document with the metadata attribute in the clinical database for storage.

9. An apparatus in accordance with claim 8 further configured to receive scripted instructions to select a patient's name or portions thereof, or other identification, from the clinical database.

10. An apparatus in accordance with claim 9 wherein said script interpreter software module further configured to interpret scripted instructions comprising one or more members of the group consisting of the time the patient first entered a caregiving facility, and starting times, ending times, and durations of one or more members of the group consisting of:
    time in a waiting room,
    time in an examination room, and
    time examining the patient.

11. An apparatus in accordance with claim 10 further configured to search for a customized, derived attribute in a document obtained using two or more members of the group utilizing a computed waiting time consisting of the time the patient first entered a caregiving facility, and starting times, ending times, and durations of one or more members of the group consisting of:
    time in a waiting room,
    time in an examination room, and
    time examining the patient.

12. An apparatus in accordance with claim 8 further configured to search for a document utilizing the customized, derived attribute.

13. An apparatus in accordance with claim 8 further having an editing module configured to edit the customized, derived attribute to include an additional attribute.

14. An apparatus in accordance with claim 13 wherein the additional attribute is a time for release of the document.

15. A medium or media having recorded thereon machine readable instructions configured to instruct a processor to store customized attributes in a clinical document architecture (CDA), the machine readable instructions comprising instructions configured to instruct the processor to:
- receive scripted instructions from a user;
- retrieve, from a clinical database, attributes to be attached to a document in accordance with the received scripted instructions;
- concatenate the retrieved attributes in accordance with the scripted instructions to create a customized, derived attribute;
- embed the customized, derived attribute as metadata within the document and include a relationship between the customized, derived attribute and the document;
- categorize the document with other documents that include the same customized, derived attributes; and
- write the document with the metadata attribute in the clinical database.

16. A medium or media in accordance with claim 15 wherein the machine readable instructions further include instructions configured to instruct the processor to interpret user-provided scripted instructions to select and include a patient's name or portions thereof, or other identification in the customized, derived attribute.

17. A medium or media in accordance with claim 16 wherein the machine readable instructions further include instructions configured to instruct the processor to interpret user-provided scripted instructions to select and include one or more members of the group consisting of the time the patient first entered a caregiving facility, and starting times, ending times, and durations of one or more members of the set consisting of:
- time in a waiting room,
- time in an examination room, and
- time examining the patient,
in the customized, derived attribute.

18. A medium or media in accordance with claim 17 wherein the machine readable instructions further include instructions configured to instruct the processor to search for customized, derived attributes included in documents obtained using two or more members of the group utilizing a computed waiting consisting of the time the patient first entered a caregiving facility, and starting times, ending times, and durations of one or more members of the group consisting of:
- time in a waiting room,
- time in an examination room, and
- time examining the patient.

19. A medium or media in accordance with claim 15 wherein the machine readable instructions further include instructions configured to instruct the processor to search for a document utilizing the customized, derived attribute.

20. A medium or media in accordance with claim 15 wherein the machine readable instructions further include instructions configured to instruct the processor to edit the customized, derived attribute to include an additional attribute.

* * * * *

UNITED STATES PATENT AND TRADEMARK OFFICE
CERTIFICATE OF CORRECTION

| | |
|---|---|
| PATENT NO. | : 8,166,389 B2 |
| APPLICATION NO. | : 11/673078 |
| DATED | : April 24, 2012 |
| INVENTOR(S) | : Czaplewski et al. |

It is certified that error appears in the above-identified patent and that said Letters Patent is hereby corrected as shown below:

In the Specifications:

In Column 4, Line 30, delete "editor 24" and insert -- editor 14 --, therefor.

In the Claims:

In Column 8, Line 11, in Claim 18, delete "waiting" and insert -- waiting time --, therefor.

Signed and Sealed this
Seventh Day of May, 2013

Teresa Stanek Rea
*Acting Director of the United States Patent and Trademark Office*